United States Patent
Hildebrandt et al.

(10) Patent No.: US 12,024,468 B2
(45) Date of Patent: Jul. 2, 2024

(54) PROCESS FOR PRODUCING THIN TRANSPARENT CERAMIC PARTS AND THIN TRANSPARENT CERAMIC PARTS

(71) Applicant: FRAUNHOFER-GESELLSCHAFT ZUR FÖRDERUNG DER ANGEWANDTEN FORSCHUNG E.V., Munich (DE)

(72) Inventors: Stefanie Hildebrandt, Dresden (DE); Thomas Hutzler, Dresden (DE); Lutz-Michael Berger, Dresden (DE)

(73) Assignee: FRAUNHOFER-GESELLSCHAFT ZUE FÖRDERUNG DER ANGEWANDTEN FORSCHUNG E.V., Munich (DE)

( * ) Notice: Subject to any disclaimer, the term of this patent is extended or adjusted under 35 U.S.C. 154(b) by 203 days.

(21) Appl. No.: 17/413,116

(22) PCT Filed: Dec. 10, 2019

(86) PCT No.: PCT/EP2019/084391
§ 371 (c)(1),
(2) Date: Jun. 11, 2021

(87) PCT Pub. No.: WO2020/120458
PCT Pub. Date: Jun. 18, 2020

(65) Prior Publication Data
US 2022/0098110 A1    Mar. 31, 2022

(30) Foreign Application Priority Data
Dec. 14, 2018 (DE) .......... 102018132319.0

(51) Int. Cl.
C04B 35/115 (2006.01)
C04B 35/44 (2006.01)
C04B 35/626 (2006.01)
C04B 35/634 (2006.01)
C04B 35/645 (2006.01)

(52) U.S. Cl.
CPC .......... C04B 35/115 (2013.01); C04B 35/44 (2013.01); C04B 35/6261 (2013.01); C04B 35/63424 (2013.01); C04B 35/6455 (2013.01); C04B 2237/343 (2013.01)

(58) Field of Classification Search
None
See application file for complete search history.

(56) References Cited

U.S. PATENT DOCUMENTS

| 7,247,589 B2 | 7/2007 | Krell et al. |
| 7,799,267 B2 | 9/2010 | Messing et al. |
| 9,309,156 B2 | 4/2016 | Hutzler et al. |
| 9,624,136 B2 | 4/2017 | Badding et al. |
| 2004/0265602 A1* | 12/2004 | Kobayashi ............ G06F 3/045 428/458 |
| 2005/0164867 A1 | 7/2005 | Krell et al. |
| 2010/0065189 A1* | 3/2010 | Mase ................ C04B 37/001 264/642 |
| 2012/0010066 A1 | 1/2012 | Fischer et al. |
| 2014/0183799 A1* | 7/2014 | Fischer ............... A61K 6/822 264/642 |
| 2016/0002117 A1 | 1/2016 | Badding et al. |
| 2016/0060131 A1 | 3/2016 | Binhussain et al. |
| 2016/0060173 A1* | 3/2016 | Binhussain ....... C04B 35/62625 423/625 |
| 2017/0182749 A1 | 6/2017 | Schnetter et al. |
| 2017/0183265 A1 | 6/2017 | Badding et al. |
| 2017/0333223 A1* | 11/2017 | Rasmussen ............ F03G 7/005 |
| 2018/0155247 A1 | 6/2018 | Schnetter et al. |

FOREIGN PATENT DOCUMENTS

| DE | 10 2004 004259 | 11/2005 |
| DE | 10 2005 007 036 | 8/2006 |
| DE | 10 2008 063926 | 6/2010 |
| DE | 10 2010 007 359 | 3/2011 |
| DE | 10 2012 220 257 | 5/2013 |

(Continued)

OTHER PUBLICATIONS

Goldstein et al., "Transparent Ceramics at 50: Progress Made and Further Prospects", J. Am. Ceram. Soc. 99 [10] (2016), pp. 3173-3197.
Krell et al., "Defect strategies for an Improved optical quality of transparent ceramics", Opt. Mater. 38 (2014), pp. 61-74.
Krell et al., "Order of influences on the ballistic resistance of armor ceramics and single crystals", Mater. Sci Eng. A 597 (2014), pp. 422-430.
Sigmund et al., "Novel Powder-Processing Methods for Advanced Ceramics", J. Am. Ceram. Soc. 83 [7] (2000), pp. 1557-1574.
Int'l Search Report (Form PCT/ISA/210) conducted in Int'l Appln. No. PCT/EP2019/084391 (Mar. 23, 2020).
Int'l Written Opinion (Form PCT/ISA/237) conducted in Int'l Appln. No. PCT/EP2019/084391 (Mar. 23, 2020).

*Primary Examiner* — Mohammad M Ameen
(74) *Attorney, Agent, or Firm* — GREENBLUM & BERNSTEIN, P.L.C.

(57) ABSTRACT

The invention relates to the field of ceramics and concerns a method for use in displays of electronic devices with high mechanical stress, for example. The object of the present invention is to provide a method by means of which thin ceramic parts having thicknesses of substantially <1 mm with high transparency are produced. The object is achieved by a method for producing thin transparent ceramic parts, in which ceramic powders are mixed together with a solvent and a monomer and a photoinitiator, and at least 0.0005% by mass of a photoinitiator is added, the mixture is subsequently introduced into a mould, then the mixture is irradiated for at least 1 min with light which has a wavelength for activating the photoinitiator, the moulded body is subsequently removed from the mould and dried, and then the debinding and sintering of the moulded body is carried out.

20 Claims, No Drawings

(56) References Cited

FOREIGN PATENT DOCUMENTS

| | | |
|---|---|---|
| DE | 10 2015 202 083 | 8/2015 |
| DE | 10 2016 210811 | 12/2016 |
| EP | 2 404 590 | 1/2012 |
| EP | 2 990 392 | 3/2016 |
| WO | 98/51747 | 11/1998 |
| WO | 2016/003965 | 1/2016 |

* cited by examiner ial-specific reflection on the respective front and back side.
PROCESS FOR PRODUCING THIN TRANSPARENT CERAMIC PARTS AND THIN TRANSPARENT CERAMIC PARTS The invention is concerned with the field of ceramics and relates to a process for producing large-format thin transparent ceramic parts for example for applications in displays of electronic devices with elevated mechanical requirements, for example as touchscreens for smartphones and tablets or as a transparent protection window of optical devices for use under harsh conditions.

Transparent ceramics are well known in principle and combine the known properties of ceramics such as high hardness, strength and chemical resistance with optical functionality. Employed transparent ceramics include especially high-purity crystallographically monophasic ceramic materials having a cubic crystal structure since, in contrast to ceramics having non-cubic crystal structures, their transparency has no effect on component thickness owing to a lack of intrinsic double refraction. The importance of materials having a cubic crystal structure for transparent ceramics is described in detail both in the patent literature such as U.S. Pat. No. 7,247,589 B2 and U.S. Pat. No. 9,309,156 B2 and in the academic lecture [A. Goldstein, A. Krell, J. Am. Ceram. Soc. 99 [10] (2016) 3173-3197].

The transparency of ceramics may be unambiguously determined using the RIT value (real in-line transmission), such as described in U.S. Pat. No. 7,247,589 B2 and U.S. Pat. No. 9,309,156 B2. For materials having an exceptionally low light absorption the theoretical maximum achievable transmission for optically homogeneous materials, such as glass or for single-crystals, is determined from the material-specific reflection on the respective front and back side. Reflection is dependent on the refractive index n and is calculated with the formula: $R_s=((n-1)/(n+1))^2$. The resulting theoretical maximum value of transmission $T_{max}$ is for high-transparency substances taking into account multiple reflection given by $T_{max}=(1-R)$ with $R=2 R_s/(1+R_s)$ and for low transparency materials neglecting multiple reflection given by $T_{max}=(1-R_s)^2$. In particular U.S. Pat. No. 7,247,589 B2 and U.S. Pat. No. 9,309,156 B2 refer to the need to use a very small aperture angle in the measurement. According to U.S. Pat. No. 9,309,156 B2 very finely divided and low-pore sintered corunda (trigonal) at thicknesses >1 mm have a RIT <70% while for example for MgO•Al$_2$O$_3$ spinel (cubic) measured values between 80% and 85% even at greater thicknesses were typically reported.

It is moreover necessary for transparent ceramics to have as few as possible visible defects in a size >20 μm, which have little or no influence on the results of RIT measurements. U.S. Pat. No. 9,309,156 B2 notes that these defects are hardly mentioned in the literature or that no frequency and order of magnitude is reported. Such macroscopic defects having a size >20 μm may be determined by recording relatively large areas such as 12×12 mm with a high resolution scanner and counting in images having a defined enlargement. According to U.S. Pat. No. 9,309,156 B2 thick transparent spinel ceramics contain defects having a size >20 μm at a frequency >50/cm$^3$.

The mechanical properties of hardness and strength of the cubic transparent ceramics may be improved by reducing the grain size of the sintered microstructure. Examples thereof are known from U.S. Pat. No. 7,247,589 B2 and U.S. Pat. No. 9,309,156 B2 but it must be noted that such finely crystalline sintered microstructures having average grain sizes <10 μm or even <1 μm are possible only when the required extremely low porosity is achieved at low sintering temperatures.

The lateral dimensions of sheets of transparent ceramic are in DE 10 2012 220 257 A1 reported as 50×50 mm$^2$. The academic literature reports lateral dimensions of around 100×100 mm$^2$ [A. Krell, E. Straßburger, Mater. Sci Eng. A 597 (2014) 422-430]. These have hitherto often been produced by uniaxial pressing processes with subsequent sintering and final hot isotactic pressing (HIP) or via hot pressing. Customary thicknesses, for example in ballistics protection use, are usually between 2 and 8 mm.

The disadvantage of these production processes is that the options for enlarging the lateral extent and for minimizing the thickness of planar components in the context of the molding or green body production are very strongly limited. With these technologies the realization of transparent sheets having a thickness <1 mm is possible only by very costly, complex and protracted final hard machining with diamond tools.

Liquid molding processes such as film casting, as described for example in U.S. Pat. No. 7,799,267 B2 and U.S. Pat. No. 9,624,136 B2, are thus better suited for producing thin green bodies and thin planar components made of transparent ceramic therefrom. The technological starting point for film casting is typically a ceramic suspension (slurry) based on organic solvent and a high proportion of organic auxiliaries such as binders and plasticizers. The substantial disadvantages of the typical low solids content of ceramic particles typical for these suspensions and the high viscosity resulting from the high content of organic binders does not allow the production of extremely low defect planar thin green bodies having a very high green density. In addition, the consolidation process brought about by removal of the solvent requires costly and complex drying conditions and very long process times.

WO 98/51747 discloses a nanostructured molded body and layers and a process for production thereof wherein nanoscale solids particles having polymerizable and/or polycondensable organic surface groups are used to produce a flowable mass which is introduced into a mold before polymerization and/or polycondensation of the surface groups of the solids particles to form a cured molded body.

U.S. Pat. No. 7,799,267 B2 describes the production of thin ceramic parts made of yttrium aluminum garnet (YAG) by film casting from suspensions comprising an organic solvent. The dried tapes are cut into small pieces of 30×30 mm and altogether 30 pieces are laminated atop one another and sintered exclusively thus. The sintering of individual unlaminated films is not described and so no ceramics having thicknesses <1 mm were produced.

U.S. Pat. No. 9,624,136 B2 describes the production of thin ceramic parts made of MgAl$_2$O$_4$ (spinel) by film casting with a thickness of 10 to 300 μm from aqueous suspensions. The films may also be laminated to afford a stack of 50 μm to 10 mm. A transparency of 80% to 87% and a grain size of 1 to 7 μm is reported. Surprisingly, partial transmission values higher than the theoretically possible values are reported. Since the conditions of measurement are not described it is suspected that these are not RIT measurements but rather in-line measurements (with a larger aperture) or even total transmission measurements. The parts contain visible macroscopic defects in unquantified number and size (column 10, lines 24-29). For avoidance thereof, performance of the process under costly clean room conditions is recommended. However it is also known that the majority of all defects [A. Krell, T. Hutzler, J. Klimke, Opt.

Mater. 38 (2014) 61-74] are caused by foreign particles only to a small extent and so clean room conditions cannot remove these defects. Achieving high green densities requires a process in which a high solids content of powders having a BET specific surface area of 6-20 m²/g is already established in the suspension with the most homogeneous possible distribution of the powder particles while the suspension nevertheless has a sufficiently low viscosity to allow it to be readily degassed. This makes it possible to avoid large defects through air inclusions and the suspension may be poured into closed molds. The homogeneous distribution of the particles in the suspension must moreover be converted into a dimensionally stable body without inhomogeneous compression resulting in defects that are no longer healable by sintering. In addition, shrinkage during drying is lower for high solids contents (W. Sigmund et al., J. Am. Ceram. Soc. 83 [7] 1557-1574 (2000)).

Gelcasting is a liquid molding technology which allows very high packing densities of the powder particles and thus high green densities. In gelcasting aqueous or solvent-containing solids-rich suspensions (slurries) are mixed with monomer systems. Inorganic solids may be oxides or metallic particles. (W. Sigmund et al., J. Am. Ceram. Soc. 83 [7] 1557-1574 (2000)).

Production of molded bodies by gelcasting requires intimate knowledge of handling suspensions, of intensive milling processes for deagglomeration, of compatible monomers, crosslinkers and accelerator mixtures and the respective concentrations as well as appropriate casting molds and abhesives for the surfaces of the casting molds, of demolding and handling of the gel bodies, and of drying and subsequent thermal further processing.

Since especially thin ceramic bodies often require a smooth surface and also a warpage-free mold the gelcasting process has hitherto been difficult to use or unsuitable. The polymerization time in classical gelcasting is between one hour up to several hours. The highly concentrated suspensions may therefore lose their stability under the thermal influence necessary for polymerization. The consequences are inhomogeneous distributions in the gel body which in the further course of the process, particularly in the case of thin specimens, result in cracks or in porous regions. After demolding the gel bodies are dried between porous sheets under pressure. However, this often results in microcracks in the dried molded body. Thin gel bodies are therefore often also dried under pressure between dense bodies, thus reducing the drying speed and consequently making it possible to at least partially avoid changes in shape and microcracks. However, such drying requires a very long drying time of several weeks.

A disadvantage of the prior art solutions is that especially the production of a transparent ceramic having thicknesses of <1 mm is protracted and difficult from a production technology standpoint. Furthermore, prior art transparent ceramics are very often produced with visible defects >20 µm.

The problem addressed by the present invention is that of producing a process for producing thin transparent ceramic parts which allows simple production in a relatively short time of thin ceramic parts having thicknesses of substantially <1 mm with high transparency and a low frequency <50/cm³ of visible defects >20 µm.

The problem is solved by the invention specified in the claims. Advantageous embodiments are specified in the subsidiary claims.

In the process according to the invention for producing thin transparent ceramic parts ceramic powders for producing a transparent ceramic are mixed in conjunction with at least one solvent and one monomer and one photoinitiator, wherein the powders have a BET specific surface area of at least 6-20 m²/g, and during the mixing or subsequently at least 2% by mass of monomers capable of free-radical polymerization and at least 0.0005% by mass of a photoinitiator are added to the mixture and the mixture is subsequently degassed and introduced into a mold which may comprise a carrier, wherein the mold is transparent at least for light having the wavelength necessary for activation of the photoinitiator, the mixture in the mold is subsequently irradiated over at least 1 min with light comprising at least one wavelength for activating the photoinitiator, wherein after the first mixture further mixtures having an identical or different composition may be introduced into the mold atop a respectively irradiated mixture, wherein after each introduction of a mixture an irradiation is performed, the molded body is subsequently demolded from the mold and dried and subsequently the debindering and sintering of the molded body is performed and subsequently a mechanical machining for producing the thin transparent ceramic parts may be carried out.

The ceramic powders employed are advantageously selected from aluminum oxide, spinel $MgAl_2O_4$, cubic zirconium oxide, aluminum oxynitride AlON, yttrium oxide, yttrium aluminum garnet (YAG) $Y_3Al_5O_{12}$, magnesium oxide.

The solvents employed are likewise advantageously water or an organic solvent or solvent mixture or water with $HNO_3$ or $NH_4OH$.

The mixing is furthermore advantageously performed by milling in an attritor or a ball mill.

The monomers employed are likewise advantageously methacrylamide or polyethylene glycol 1000 dimethacrylate, 2-hydroxyethyl methacrylate, tetrahydrofuryl methacrylate, 2-carboxyethyl acrylate, N,N-dimethylacrylamide, 1-vinyl-2-pyrrolidone and polyethylene glycol 1000 monomethyl ether monomethacrylate, N,N-methylenebisacrylamide and PEO(5800)-b-PPO(3000)-b-PEO(5800) dimethacrylate and/or mixtures of these monomers.

It is also advantageous when monomers are added to the mixture in a mass ratio of monomer having one double bond: monomer having at least two double bonds of 2:1 to 5:1.

It is further advantageous when the photoinitiator employed is 1-hydroxycyclohexylphenylketone or 2-hydroxy-2-methylpropiophenone.

It is likewise advantageous when 0.001% to 0.05% by mass of a photoinitiator are added.

It is also advantageous when the degassing is performed under vacuum.

It is also advantageous when molds are used, which implement molded bodies with thicknesses of 10 to 1300 µm, advantageously 50 to 1000 µm, more advantageously 100 to 500 µm.

It is also advantageous when a carrier made of a porous material is employed, advantageously paper sheets, membranes or ceramic films.

It is likewise advantageous when light in the wavelength range of 200-450 nm is used.

It is also advantageous when the mixture in the mold is irradiated with light over 5 min to 20 min.

It is also advantageous when the mixture is introduced into the mold and subsequently irradiated and subsequently the mixture or a mixture having a different composition is introduced into the mold atop the previously irradiated mixture two or more times and after each introduction of a mixture said mixture is irradiated.

It is also advantageous when in the case of repeated introduction of mixtures into the mold identical or different amounts of mixture are introduced, wherein the individual mixtures are introduced atop one another to effect complete or partial coverage.

It is also advantageous when in the case of introduction of mixtures of different compositions the mixtures are irradiated with light of different or identical wavelength and/or for different or identical durations.

It is also advantageous when during production of the molded body as a gel body, dried gel body, green body and sintered body in the sequence of the process procedure the process conditions are realized under atmospheric conditions and/or pressurelessly.

It is likewise advantageous when known auxiliary and additive substances are employed for the suspending, mixing and producing of the molded bodies up to the gel body.

It is also advantageous when the drying of the molded body is performed in a polymer solution and atop and/or between carriers, wherein the polymer solution employed is advantageously selected from water-soluble or alcohol-soluble polymers, such as polyvinyl alcohol, polyvinyl acetate, polyacrylamide, polyamide, polyethylene oxide, polyacrylate, polyvinylpyrrolidone, polyethylene glycol and/or derivatives or mixtures thereof.

It is also advantageous when the sintering is performed under the sintering conditions known for the sintering of transparent ceramics and/or to produce warpage-free transparent ceramics the parts are subjected to mechanical load at least during the sintering.

It is further advantageous when after the sintering of the molded body a mechanical machining of the sintered body by sawing, grinding and/or polishing is performed.

The thin transparent ceramic parts according to the invention having thicknesses of at least 10 to less than 1000 μm have in the case of ceramic materials having a non-cubic crystal structure a transparency of RIT >70% of the theoretically possible transmission and in the case of ceramic materials having a cubic crystal structure a transparency of RIT >90% of the theoretically possible transmission.

It is advantageous when the thin transparent ceramic parts of high transparency exhibit a low frequency of <50/cm$^3$ of visible defects >20 μm.

The solution according to the invention makes it possible for the first time to produce thin ceramic parts with high transparency and a low frequency of <50/cm$^3$ of visible defects >20 μm which are easily produced in a relatively short time in thicknesses of substantially <1 mm.

This is achieved by a process in which ceramic powders for producing a transparent ceramic are mixed together with at least one solvent and one monomer and one photoinitiator.

In the context of the present invention in each case:

a solvent is an organic solvent or solvent mixture or water with and/or without organic solvents, wherein the solvents dissolve at least the monomers and photoinitiators capable of free-radical polymerization;

a mixture may be a "suspension" or a "slurry" and describes the state of the mixture of the ceramic powder with the solvents, monomers and photoinitiators in the process before the consolidation to afford a gel body under light is carried out;

a "gel body" describes the state of a body in the process after the irradiation with light has been carried out but before any removal of the solvents and the organic constituents has been carried out;

a "dried gel body" describes the state of the gel body after the removal of the solvent;

a "green body" describes the state of a body in the process which after the burning off of all remaining organic constituents known as "debindering" contains only inorganic constituents;

a "sintered body" describes the state of a body in the process present which is present after the sintering, wherein the sintered body is in the form of a "transparent part" after the sintering and pressure-assisted postcompression.

It is advantageous when the ceramic powders employed are powders having a cubic crystal structure. These include spinel $MgAl_2O_4$, cubic zirconium oxide, aluminum oxynitride AlON, yttrium oxide, yttrium aluminum garnet (YAG) $Y_3Al_5O_{12}$, magnesium oxide and others. It is also possible to employ powders with non-cubic crystal structures, such as aluminum oxide.

According to the invention thin transparent ceramic parts are in the context of the present invention parts having thicknesses of at least 10 to less than 1000 μm.

Starting materials employed further include ceramic powders having a BET specific surface area of at least 6-20 m$^2$/g which also have a high purity in order that a transparent ceramic is also producible therefrom.

To improve the transparency and the mechanical properties of the ceramic parts it is likewise possible to add dopants, such as Ba, Sr and others, to the mixture of the starting materials.

As solvents it is advantageous when the organic solvent water is employed or an organic solvent or solvent mixture or an aqueous solvent or solvent mixture, such as water with $HNO_3$ or $NH_4OH$.

To produce the thin transparent ceramic parts the ceramic powders are mixed in conjunction with solvents, such as water or aqueous or solvent-containing solvents, to produce a solids-rich suspension or a slurry. The mixing of the starting materials may advantageously be performed by milling in an attritor or a ball mill. The mixing of the starting powder with the solvents, the monomers and the photoinitiators may further be carried out with stirring and/or under the influence of ultrasound and/or with cooling. The total organic proportion of the mixture composed of the ceramic powders and solvents, monomers and photoinitiators contains at least monomers capable of free-radical polymerization and photoinitiators, wherein further organic additives known per se, such as dispersants and/or defoamers, may optionally be present. It is preferable when the total organic proportion is <10.0% by mass, advantageously <7.5% by mass.

The milling of ceramic materials having a non-cubic crystal structure may advantageously be carried out in an attritor having Y-stabilized $ZrO_2$ milling balls and a Y-stabilized $ZrO_2$ lining or aluminum oxide milling balls and a polyethylene lining. For materials having a cubic crystal structure milling balls of the same material or aluminum oxide milling balls and a polyethylene lining are employed. The milling balls have an average diameter of <4 mm, advantageously <2 mm or <0.5 mm. The milling duration is between 0.25 and 6 h, advantageously <2 h.

According to the invention it was assumed that the higher the total organic proportion of the solvents in the slurry and thus in a gel body the higher the resulting porosity in the green body and the lower the green density. A high solids content of ceramic powders in the slurry thus ensures a high green density and also that the very low distances between the particles that were present in the mixture, usually a solids-rich suspension, are then retained in the green body. This will then lead to a very narrow pore size distribution in the thermally debindered green body which allows for a high sintering compression as is required to achieve a transparent ceramic.

Advantageously employable dispersion aids include triammonium citrate, polyacryloyl ammonium salts, ammonium salts of oleic acids or commercial dispersing agent mixtures, such as Dispex A40 or Dolapix.

Instead of dispersion aids the solvent may also be made acidic or basic, which may advantageously be realized with nitric acid or ammonium hydroxide.

During the mixing or subsequently, else during the milling or subsequently, at least 2% by mass of monomers based on the mixture are added, wherein monomers capable of free-radical polymerization are added.

According to the invention the monomer systems required in the gel casting process include monomers having one or more double bonds which optionally contain one or more stabilizing groups in the vinyl or allyl position, for example an aromatic system, carbonyl groups, ethanamide groups or secondary to quaternary carbon groups. Monomers having two or more functional groups likewise act as crosslinkers.

Monomers having a double bond are for example methacrylamide, 2-hydroxyethyl methacrylate, 2-hdroxyethyl methacrylate, tetrahydrofuryl methacrylate, 2-carboxyethyl acrylate, N,N-dimethylacrylamide, 1-vinyl-2-pyrrolidone and polyethylene glycol 1000 monomethyl ether monomethacrylate.

Monomers having two or more double bonds are, for example, polyethylene glycol 1000 dimethacrylate, N,N-methylenebisacrylamide and PEO(5800)-b-PPO(3000)-b-PEO(5800) dimethacrylate.

The monomers may be employed singly or in admixture.

The combination of monomers for radical polymerization and crosslinkers causes a polymeric network to extend around the solids particles of the ceramic powders which also includes the solvent which may be water or an organic solvent or solvent mixture. This makes it possible to convert the solids-rich, highly disperse and homogeneous mixture of at least ceramic powders, solvents, monomers and photoinitiators into a molded body (consolidation). This molded body is the gel body and/or the dried gel body and/or the green or sintered body molded in a mold.

The monomers employed according to the invention may further be added to the mixture in a mass ratio of monomer having a double bond : monomer having at least two double bonds of 3:2 to 5:1.

According to the invention the consolidation of the molded gel body by means of the free-radical polymerization requires only the addition of a very small amount of monomers, namely at least 2.0% by mass, advantageously between 4.0% and <7.5% by mass based on the mixture.

According to the invention at least 0.0005% by mass, advantageously 0.001% to 0.05% by mass, of a photoinitiator is further added to the mixture.

Advantageously employable photoinitiators include 1-hydroxycyclohexylphenylketone or 2-hydroxy-2-methylpropiophenone. Photoinitiators employed according to the invention are those which under irradiation by light form a radical which initiates the chain reaction for a free-radical polymerization.

The mixture is subsequently degassed and introduced into a mold. The degassing may advantageously be performed under vacuum.

The homogeneous particle distribution thus made possible is retained after the polymerization not only during demolding from the mold but also during the subsequent uniform drying and also during the debindering. The debindered green body obtained according to the invention has a small homogeneously distributed open porosity having a very narrow size distribution. Average pore diameters of 0.04-0.06 µm and densities of 55-66% may be achieved. As a result of the subsequent sintering of the green body and postcompression with HIP the pores are virtually completely eliminated and a density of >99.9% near the theoretical limit is achieved.

The molds for the gel casting process may consist of a dense or porous material and dense or porous carriers may also be present in the mold. The mold may also be provided with an abhesive. Both the use of a carrier and an abhesive make it possible to achieve easier demolding while still achieving polymerization.

The molds may be open or closed. The use of closed molds does entail a low viscosity of the mixture for bubble-free filling but drying of near-surface regions of the gel body before the polymerization has completely terminated is prevented and/or inhibited.

Open molds may also be employed without lateral delimitation, which also has the result that carrier materials, such as coated paper, porous membranes, ultrathin glass or films may be more readily employed. The use of flexible carriers enables both a discontinuous and a continuous molding process utilizing for example roll-to-roll technology.

The molds employed according to the invention can realize the production according to the invention of molded bodies having thicknesses of 1 to 1300 µm, advantageously having thicknesses of 50 to 1000 µm, more advantageously having thicknesses of 100 to 500 µm.

The material for the molds employed according to the invention must further be transparent at least for light having the wavelength necessary for activation of the photoinitiator.

The introduction of the mixture into a mold may be carried out one or more times, wherein identical mixtures or else mixtures of different compositions may be employed and/or complete or partial coverage of a mixture by the next introduced mixture may be realized and/or identical or different amounts of mixtures may be introduced into the mold and/or the irradiation with light may be realized with identical or different wavelengths and/or the irradiation with light may be performed over identical or different durations.

The introduction of only one mixture is particularly advantageous according to the invention.

The introduction of mixtures is advantageously performed two or more times, for example 2-20 times. This makes it possible to introduce very thin layers of mixtures which comprise a different amount, coverage and/or composition, with the result that very different thin transparent ceramic parts are producible.

The possibility of irradiation with light of different wavelengths and/or durations also allows controlled establishment of polymerization of the monomers in individual layers and regions in a targeted manner.

According to the invention the mixture is in the mold subsequently irradiated with light over at least 1 min, wherein the light must have at least one wavelength for activation of the photoinitiator.

According to the invention the consolidation or solidification of the gel molded body is carried out under the influence of light with the photoinitiators which initiate the free-radical polymerization over 1 to advantageously 30 min, advantageously over 5 min to 20 min. The reaction at room temperature ensures that drying is avoided even in open molds.

To initiate the polymerization the photoinitiators decompose into radicals which bring about the commencement of polymerization.

The molded body is subsequently demolded from the mold and dried. Advantageously the drying of the molded body is performed in a polymer solution and atop and/or between carriers. Employable carriers likewise include carriers made of a porous material, advantageously paper sheets, membranes or ceramic films. Advantageously employable polymer solutions include water-soluble or alcohol-soluble polymers, such as polyvinyl alcohol, polyvinyl acetate, polyacrylamide, polyamide, polyethylene oxide, polyacrylate, polyvinylpyrrolidone, polyethylene glycol and/or derivatives or mixtures thereof. Their solubility depends on the chain length. It is also possible to employ derivatives of the polymers with different chain lengths or else combinations or mixtures of polymers or polymeric copolymers with or without further functional groups.

The drying is followed by the debindering and sintering of the molded bodies. These process steps may be carried out in one step with different heating rates and holding times so that the molded body is first dried and subsequently debindered and sintered. According to the invention the actual sintering is always followed by the postcompression of the molded body to produce the required transparency of the ceramic parts.

The use of starting powders having a BET specific surface area between 6-20 $m^2/g$ and a high solids content of 50-85% by mass makes it possible to achieve a low shrinkage during the drying and sintering. The monomer content of 3% to 6% by mass based on the mixture achieves handleable moist molded bodies through an optimum of gel body strength and very low amount of to-be-removed total proportion of organic constituents in the mixture. The established viscosity of the mixture of <50 mPas at 1 $s^{-1}$ at 25° C. achieves an optimum between the highest possible solids content and the ability of the mixture to be degassed and cast.

In the process according to the invention process conditions during the production of the gel body, green body and sintered body are realized under atmospheric conditions and/or pressurelessly. To avoid warpage a static weighting may be used.

The process according to the invention also employs the assistant and additive substances known for mixing and production of a green ceramic molded body.

The sintering of the green body of the process according to the invention is also performed under the sintering conditions known for the sintering of transparent ceramics.

After the sintering the sintered bodies may also be supplied to a mechanical machining. This mechanical machining may be realized by sawing, grinding and/or polishing.

The thin transparent ceramic parts according to the invention having thicknesses of at least 10 to less than 1000 μm have in the case of ceramic materials of non-cubic crystal structure a transparency of RIT >70% of the theoretically possible transmission and in the case of ceramic materials of cubic crystal structure a transparency of RIT >90% of the theoretically possible transmission, wherein advantageously a transparency of RIT >55%, advantageously RIT >80%, is obtained and macroscopic defects >20 μm occur with a defect density of <50/$cm^3$.

The process according to the invention allows the production of thin transparent, in particular also planar, ceramic parts highly varied in shape and size with high transparency near to the theoretical limit due to very low residual porosity with a simple process over short process times.

The thin transparent ceramic parts according to the invention produced with the process according to the invention may be employed especially for uses with elevated mechanical requirements, for example as touchscreens or surfaces of lenses or windows, or with elevated quality requirements, for example for optical instruments. They meet the requirements of strength and transparency.

It is particularly advantageous that such thin transparent ceramic parts are producible over markedly shorter periods and with a small number of parts having unallowable defects. This is possible especially since the consolidation of the mixture in the mold is according to the invention carried out very much faster by the irradiation and the produced green bodies have a sufficiently high strength for the subsequent handling and exhibit fewer microcracks and a comparatively smooth surface. It will be appreciated that the sintered bodies may be subjected to plane parallel grinding and polishing.

The invention is hereinbelow more particularly elucidated with the aid of several working examples.

Example 1

Spinel powder having a (BET) specific surface of 16-17 $m^2/g$ is dispersed in deionized water using a stirrer and Dispex A40. The solids content of the suspension is 68% by mass. The suspension is milled for two hours using a stirrer ball mill and aluminum oxide milling balls (diameter 2 mm), milling disks and a milling beaker, both made of polyethylene. The milling balls are subsequently separated from the suspension. The monomers methacrylamide (MAM) and polyethylene glycol 1000 dimethacrylate (PEGDMA) are subsequently introduced into the suspension in the ratio 3:1 and with a mass content based on the solids content of altogether 8.0% by mass and mixed and dissolved.

After the degassing of the suspension by stirring under vacuum the solution of 10% by mass of the photoinitiator 1-hydroxycyclohexylphenylketone in ethanol is added dropwise. Altogether a photoinitiator concentration of 0.005% by mass is added to the suspension. The suspension is poured into an open 40×70 mm glass mold lined with polyethylene film carrier in a thickness of 1.3 mm. The suspension is consolidated by polymerization over 15 minutes using UV light of the wavelength spectrum 200-400 nm.

The moist flexible gel bodies are removed from the mold with a polyethylene film and then submerged in a 40% PEG solution for drying. To avoid warpage the gel body on the carrier is stored in the drying solution between two glass sheets with applied abhesive for 5 h and subsequently detached. This is followed by further drying in air between gypsum sheets. To protect against adhesion and damage to the surface of the gel body a coated carrier paper is on both sides placed between the gel body and the gypsum sheets. The progress of the drying is monitored by determining the mass loss and the gel body remains between the carrier papers until a constant mass is achieved. The carrier papers are subsequently removed and the organic additives burnt off from the dried gel body, now inflexible due to water removal, for 2 h at 800° C. in air. This affords the green body composed only of inorganic materials with pores which is subsequently sintered.

For dimensional stabilization the green body is during the two hour sintering at 1550° C. placed between aluminum oxide sheets and thus mechanically weighted. This is followed by the hot isotactic postcompression (HIP) over 8 h at 1750° C. in an argon atmosphere.

The density of the molded body after sintering is 97.5% and of the transparent ceramic parts after the HIP is >99.9%.

After bothsided plane parallel grinding and polishing to a thickness of 0.57 mm a real in-line transmission (RIT) of 99.4% of the theoretical maximum for spinel is spectrometrically measured. After ceramographic preparation, microstructure electron micrographs were used to determine by the line section method with a correction factor of 1.56 a bimodal distribution of the average microstructure grain size in the range of 45.8 and 1.8 µm.

To characterize the visible defect population above a size of 20 µm a 12×12 mm specimen section was recorded with a high resolution scanner. A 20 times magnified graphical image of this section was used to count the visible defects. A defect concentration of 47/cm$^3$ was determined.

Example 2

Aluminum oxide powder having a (BET) specific surface of 11-14 cm$^2$/g is dispersed in deionized water using a stirrer and with stabilization of the pH to 4.0 by addition of HNO$_3$. The solids content of the suspension is 75% by mass. A 0.018% magnesium doping in the form of mgAl$_2$O$_4$ is introduced as sintering aid. The suspension is milled for two hours using a stirrer ball mill and milling balls (diameter 0.5 mm), milling disks and a milling beaker, all made of Y-stabilized ZrO$_2$. The milling balls are subsequently separated from the suspension. The monomers methacrylamide (MAM) and polyethylene glycol 1000 dimethacrylate (PEGDMA) are subsequently introduced into the suspension in the ratio 3:1 and with a mass content based on the solids content of altogether 4.5% by mass and mixed and dissolved.

After the degassing of the suspension by stirring under vacuum the solution of 10% by mass of the photoinitiator 1-hydroxycyclohexylphenylketone in ethanol is added dropwise. Altogether a photoinitiator concentration of 0.005% by mass is added to the suspension. The suspension is filled into a UV light-transparent closed mold for a square sheet of 40 mm edge length and 1 mm thickness, which is coated with a silicone-free abhesive, and consolidated by polymerization over 15 minutes using UV light of the wavelength spectrum 200-400 nm.

The moist flexible gel bodies are then submerged in a 40% PEG solution for drying. To avoid warpage the gel body is stored in the drying solution between two glass sheets with applied abhesive for 5 h and subsequently detached. This is followed by further drying in air between gypsum sheets. To protect against adhesion and damage to the surface of the gel body a coated carrier paper is on both sides placed between the gel body and the gypsum sheets. The progress of the drying is monitored by determining the mass loss and the gel body remains between the carrier papers until a constant mass is achieved. The carrier papers are subsequently removed and the organic additives burnt off from the dried gel body, now inflexible due to water removal, for 2 h at 800° C. in air. This affords the green body composed only of inorganic materials with pores which is subsequently sintered.

For dimensional stabilization the green body is during the two hour sintering at 1270° C. placed between aluminum oxide sheets and thus mechanically weighted. This is followed by the hot isotactic postcompression (HIP) over 15 h at 1280° C. in an argon atmosphere. The density of the molded body after sintering is 95.3% and of the transparent ceramic parts after the HIP is >99.9%.

After bothsided plane parallel grinding and polishing to a thickness of 0.5 mm a real in-line transmission (RIT) of 83% of the theoretical maximum for single-crystal Al$_2$O$_3$ is spectrometrically measured. After ceramographic preparation, microstructure electron micrographs were used to determine by the line section method with a correction factor of 1.56 an average microstructure grain size of 0.45 µm.

To characterize the visible defect population above a size of 20 µm a 12×12 mm specimen section was recorded with a high resolution scanner. A 20 times magnified graphical image of this section was used to count the visible defects. A defect concentration of 19/cm$^3$ was determined.

Example 3

Spinel powder having a (BET) specific surface of 16-17 m$^2$/g is dispersed in deionized water using a stirrer and Dispex A40. The solids content of the suspension is 68% by mass. The suspension is milled for two hours using a stirrer ball mill and aluminum oxide milling balls (diameter 2 mm), milling disks and a milling beaker, both made of polyethylene. The milling balls are subsequently separated from the suspension. The monomers N-vinylpyrrolidone (NVP) and polyethylene glycol 1000 dimethacrylate (PEGDMA) are subsequently introduced into the suspension in the ratio 3:2 and with a mass content based on the solids content of altogether 5.8% by mass and mixed and dissolved.

After the degassing of the suspension by stirring under vacuum the solution of 8% by mass of the photoinitiator 2-hydroxy-2-methylpropiophenone in ethanol is added dropwise. Altogether a photoinitiator concentration of 0.01% by mass is added to the suspension. The suspension is poured into an open 40×70 mm glass mold in a thickness of 1.3 mm. The suspension is consolidated by polymerization over 20 minutes using UV light of the wavelength spectrum 200-400 nm.

The moist flexible gel bodies are removed from the mold and then submerged in a 40% PEG solution for drying. To avoid warpage the gel body is stored in the drying solution between two glass sheets with applied abhesive for 5 h and subsequently detached.

This is followed by further drying in air between gypsum sheets. To protect against adhesion and damage to the surface of the gel body a coated carrier paper is on both sides placed between the gel body and the gypsum sheets. The progress of the drying is monitored by determining the mass loss and the gel body remains between the carrier papers until a constant mass is achieved. The carrier papers are subsequently removed and the organic additives burnt off from the dried gel body, now inflexible due to water removal, for 2 h at 800° C. in air. This affords the green body composed only of inorganic materials with pores which is subsequently sintered.

For dimensional stabilization the green body is during the two hour sintering at 1540° C. placed between aluminum oxide sheets and thus mechanically weighted. This is followed by the hot isotactic postcompression (HIP) over 8 h at 1750° C. in an argon atmosphere. The density of the molded body after sintering is 98.5% and of the transparent ceramic parts after the HIP is >99.9%.

After bothsided plane parallel grinding and polishing to a thickness of 1.00 mm a real in-line transmission (RIT) of 95.2% of the theoretical maximum for spinel is spectrometrically measured. After ceramographic preparation, microstructure electron micrographs were used to determine by the line section method with a correction factor of 1.56 an average bimodal microstructure grain size in the range of 49.6 and 1.7 µm.

To characterize the visible defect population above a size of 20 µm a 12×12 mm specimen section was recorded with a high resolution scanner. A 20 times magnified graphical image of this section was used to count the visible defects. A defect concentration of 24/cm$^3$ was determined.

Example 4

Spinel powder having a (BET) specific surface of 16-17 m$^2$/g is dispersed in deionized water using a stirrer and triammonium citrate. The solids content of the suspension is 75% by mass. The suspension is milled for two hours using a stirrer ball mill and aluminum oxide milling balls (diameter 2 mm), milling disks and a milling beaker, both made of polyethylene. The milling balls are subsequently separated from the suspension. The monomers methacrylamide (MAM) and polyethylene glycol 1000 dimethacrylate (PEGDMA) are subsequently introduced into the suspension in the ratio 3:1 and with a mass content based on the solids content of altogether 8.5% by mass and mixed and dissolved.

After the degassing of the suspension by stirring under vacuum the solution of 8% by mass of the photoinitiator 2-hydroxy-2-methylpropiophenone in ethanol is added dropwise. Altogether a photoinitiator concentration of 0.01% by mass is added to the suspension. The suspension is poured onto a polyethylene film carrier in a thickness of 0.8 mm and covered with a further polyethylene film.

The suspension is consolidated by polymerization over 15 minutes using UV light of the wavelength spectrum 200-400 nm.

The moist flexible gel bodies are removed from the polyethylene carrier and with the covering film cut into a mold of 40×40 mm sheets. These were then submerged in a 40% PEG solution for drying. To avoid warpage the gel body is stored in the drying solution on the carrier between two glass sheets with applied abhesive for 5 h and subsequently detached from the glass sheets and from the polyethylene covering. This was followed by further drying in air in between gypsum sheets. To protect against adhesion and damage to the surface of the gel body a coated carrier paper is on both sides placed between the gel body and the gypsum sheets. The progress of the drying is monitored by determining the mass loss and the gel body remains between the carrier papers until a constant mass is achieved. The carrier papers are subsequently removed and the organic additives burnt off from the dried gel body, now inflexible due to water removal, for 2 h at 800° C. in air. This affords the green body composed only of inorganic materials with pores which is subsequently sintered.

For dimensional stabilization the green body is during the two hour sintering at 1550° C. placed between aluminum oxide sheets and thus mechanically weighted. This is followed by the hot isotactic postcompression (HIP) over 8 h at 1750° C. in an argon atmosphere.

The density of the molded body after sintering is 95.3% and of the transparent ceramic parts after the HIP is >99.9%.

After bothsided plane parallel grinding and polishing to a thickness of 0.99 mm a real in-line transmission (RIT) of 97.2% of the theoretical maximum for spinel is spectrometrically measured. After ceramographic preparation, microstructure electron micrographs were used to determine by the line section method with a correction factor of 1.56 a bimodal average microstructure grain size in the range of 50.2 and 1.5 µm.

To characterize the visible defect population above a size of 20 µm a 12 mm×12 mm specimen section was recorded with a high resolution scanner. A 20 times magnified graphical image of this section was used to count the visible defects. A defect concentration of 37/cm$^3$ was determined.

Example 5

Aluminum oxide powder having a (BET) specific surface of 11-14 cm$^2$/g is dispersed in deionized water using a stirrer and with stabilization of the pH to 4.0 by addition of HNO$_3$. The solids content of the suspension is 75% by mass. As a sintering aid 0.018% of magnesium doping in the form of MgAl$_2$O$_4$ is introduced. The suspension is milled for two hours using a stirrer ball mill and milling balls (diameter 0.5 mm), milling disks and a milling beaker, all made of Y-stabilized ZrO$_2$. The milling balls are subsequently separated from the suspension. The monomers methacrylamide (MAM) and polyethylene glycol 1000 dimethacrylate (PEGDMA) are subsequently dissolved in the suspension in the ratio 3:1 and with a mass content based on the solids content of altogether 4.5% by mass.

After degassing of the suspension by stirring under vacuum the solution of 10% by mass of the photoinitiator 1-hydroxycyclohexylphenylketone in ethanol is added dropwise. Altogether a photoinitiator concentration of 0.005% by mass is added to the suspension. The suspension is filled into an open mold for a circular sheet of 50 mm diameter, which is coated with a silicone-free abhesive, until a poured thickness of 1-2 mm was achieved. This first layer is consolidated by polymerization over 20 minutes using UV light of the wavelength spectrum 200-400 nm. The next layer of suspension is subsequently introduced to completely cover the preceding layer and likewise polymerized under identical irradiation conditions. This procedure was repeated 16 times and a gel body having a thickness of about 2 cm was obtained.

The moist gel bodies of little flexibility on account of their thickness are then submerged in a 40% PEG solution for 5 h for drying. This was followed by further drying in air on a gypsum sheet with a cover made of gypsum. The progress of the drying is monitored by determining the mass loss. The organic additives are burnt off from the gel body, now inflexible due to water removal, for 2 h at 800° C. in air. The green body is then sintered in a second heat treatment step. The green body is sintered between aluminum oxide sheets at 1300° C. for 2 h. This is followed by the hot isotactic postcompression (HIP) over 15 h at 1280° C. in an argon atmosphere.

The density after sintering is 95.6% and after HIP is >99.9%. The individual layers are visible on the outer edge of the circular sheet. The join between the layers remains intact during drying, debindering, sintering and during the HIP. After HIP a translucent circular sheet having a thickness of 1.4 mm is obtained. Since Al$_2$O$_3$ is birefractive, transmission depends on the thickness of the component. A slice of the circular sheet is therefore separated and subjected to bothsided plane parallel grinding and polishing. A real in-line transmission (RIT) of 84% of the theoretical maximum for single-crystal Al$_2$O$_3$ is spectrometrically measured for the thus obtained slice having a thickness of 0.5 mm. After ceramographic preparation, microstructure electron micrographs were used to determine by the line section method with a correction factor of 1.56 an average microstructure grain size of 0.46 μm.

To characterize the visible defect population above a size of 20 μm a 12 mm×12 mm specimen section was recorded with a high resolution scanner. A 20 times magnified graphical image of this section was used to count the visible defects. A defect concentration of 21/cm³ was determined.

Example 6

Spinel powder having a (BET) specific surface of 16-17 m²/g is dispersed in deionized water using a stirrer and Dispex A40. The solids content of the suspension is 68% by mass. The suspension is milled for six hours using a stirrer ball mill and aluminum oxide milling balls (diameter 2 mm), milling disks and a milling beaker, both made of polyethylene. The milling balls are subsequently separated from the suspension. The monomers N-vinylpyrrolidone (NVP) and polyethylene glycol 1000 dimethacrylate (PEGDMA) are subsequently dissolved in the suspension in the ratio 3:2 and with a mass content based on the solids content of altogether 5.8% by mass. After degassing of the suspension by stirring under vacuum the solution of 10% by mass of the photoinitiator bis(2,4,6-trimethylbenzoyl) phenylphosphineoxide in acetone is added dropwise. Altogether a photoinitiator concentration of 0.12% by mass is added to the suspension. The suspension is poured into an open 40×70 mm glass mold in 1.3 mm thickness. The suspension is filled in a UV-light transmissive closed mold coated with a silicone-free abhesive for a square sheet of 40 mm edge length and 1 mm thickness and consolidated by polymerization over 15 minutes using UV light of the wavelength of 365 nm.

The moist flexible gel bodies are then submerged in a 40% PEG solution for drying. In order to avoid warpage, the gel body is stored for 5 hours in the drying solution between two glass sheets with applied abhesive and then removed.

This was followed by further drying in air between paper. To protect against adhesion and damage to the surface of the gel body a coated carrier paper is in advance placed on both sides of the surface. The progress of the drying is monitored by determining the mass loss, wherein the gel body remains between the carrier papers until constant mass is achieved. The carrier papers are then removed and the organic additives burnt off from the gel body, now inflexible due to water removal, for 2 h at 800° C. in air.

The green body is then sintered in a second heat treatment step. For dimensional stabilization the green body is during the two hour sintering at 1540° C. placed between aluminum oxide sheets. This is followed by the hot isotactic postcompression (HIP) over 8 h at 1750° C. in an argon atmosphere.

The density after sintering is 98.5% and after HIP is >99.9%. After bothsided plane parallel grinding and polishing to a thickness of 1.00 mm a real in-line transmission (RIT) of 95.3% of the theoretical maximum for spinel is spectrometrically measured. After ceramographic preparation, microstructure electron micrographs were used to determine by the line section method with a correction factor of 1.56 an average bimodal microstructure grain size in the range of 49.5 and 1.8 μm.

To characterize the visible defect population above a size of 20 μm a 12 mm×12 mm specimen section was recorded with a high resolution scanner. A 20 times magnified graphical image of this section was used to count the visible defects. A defect concentration of 28/cm³ was determined.

Example 7

Spinel powder having a (BET) specific surface of 16-17 m²/g is dispersed in deionized water using a stirrer and Dispex A40. The solids content of the suspension is 68% by mass. The suspension is milled for two hours using a stirrer ball mill and aluminum oxide milling balls (diameter 2 mm), milling disks and a milling beaker, both made of polyethylene. The milling balls are subsequently separated from the suspension. The monomers methacrylamide (MAM) and polyethylene glycol 1000 dimethacrylate (PEGDMA) are subsequently introduced into the suspension in the ratio 3:1 and with a mass content based on the solids content of altogether 8.0% by mass and mixed and dissolved.

After degassing of the suspension by stirring under vacuum the solution of 10% by mass of the photoinitiator 1-hydroxycyclohexylphenylketone in ethanol is added dropwise. Altogether a photoinitiator concentration of 0.005% by mass is added to the suspension. The suspension is filled into an open mold for a circular sheet of 50 mm diameter, which is coated with a silicone-free abhesive, until a poured thickness of 1-2 mm was achieved. This first layer is consolidated by polymerization over 15 minutes using UV light of the wavelength spectrum 200-400 nm. The next layer of suspension is subsequently introduced and likewise polymerized. This procedure was repeated 16 times and a gel body having a thickness of about 2 cm was obtained. The moist flexible gel bodies are demolded and then submerged in a 40% PEG solution for drying. To avoid warpage the gel body on the carrier is stored in the drying solution between two glass sheets with applied abhesive for 5 h and subsequently detached. This was followed by further drying in air between gypsum sheets. The progress of the drying is monitored by determining the mass loss and the gel body remains between the carrier papers until a constant mass is achieved. The dried gel bodies are then burnt off for 2 h at 800° C. in air. This affords the green body composed only of inorganic materials with pores which is subsequently sintered. For dimensional stabilization the green body is during the two hour sintering at 1550° C. placed between aluminum oxide sheets and thus mechanically weighted. This is followed by the hot isotactic postcompression (HIP) over 8 h at 1750° C. in an argon atmosphere.

The density of the molded body after sintering is 97.4% and of the transparent ceramic parts after the HIP is >99.9%. After bothsided plane parallel grinding and polishing to a thickness of 0.56 mm a real in-line transmission (RIT) of 99.4% of the theoretical maximum for spinel is spectrometrically measured. After ceramographic preparation, microstructure electron micrographs were used to determine by the line section method with a correction factor of 1.56 a bimodal distribution of the average microstructure grain size in the range of 45.3 and 1.9 μm.

To characterize the visible defect population above a size of 20 μm a 12 mm×12 mm specimen section was recorded with a high resolution scanner. A 20 times magnified graphical image of this section was used to count the visible defects. A defect concentration of 50/cm³ was determined.

The invention claimed is:

1. A process for producing thin, <1 mm thick, transparent ceramic parts, having a transparency of RIT >70% of the theoretically possible transmission for ceramic materials of non-cubic crystal structure and having a transparency of RIT >90% of the theoretically possible transmission for ceramic materials of cubic crystal structure and a low frequency <50/cm³ of visible defects >20 μm, wherein ceramic powders for producing a transparent ceramic are mixed in conjunction with at least one solvent and at least one monomer and at least one photoinitiator, wherein the solvents employed are solvent water or aqueous solvents or mixtures, wherein the powders have a BET specific surface area of at least 6-20 $m^2/g$, and during the mixing or subsequently at least 2% by mass of monomers capable of free-radical polymerization and 0.0005% to 0.05% by mass of a photoinitiator are added to the mixture, and the mixture is subsequently degassed and introduced into a mold which may comprise a carrier, wherein monomers are added to the mixture in a mass ratio of monomer having one double bond: monomer having at least two double bonds of 2:1 to 5:1, wherein molds having molded bodies having thicknesses of 10 to 1300 μm are employed, wherein the mold is transparent at least for light having a wavelength necessary for activation of the photoinitiator, the mixture in the mold being subsequently irradiated at least one minute with light comprising at least one wavelength for activating the photoinitiator, wherein after the first mixture further mixtures having an identical or different composition may be introduced into the mold atop a respectively irradiated mixture, wherein after each introduction of a mixture an irradiation is performed, the molded body being subsequently demolded from the mold and dried and subsequently a debindering and sintering of the molded body is performed and subsequently a mechanical machining for producing the thin transparent ceramic parts may be carried out; and wherein light in the wavelength range of 200-450 nm is used for irradiation.

2. The process as claimed in claim 1, wherein the ceramic powders employed are selected from aluminum oxide, spinel $MgAl_2O_4$, cubic zirconium oxide, aluminum oxynitride AlON, yttrium oxide, yttrium aluminum garnet (YAG) $Y_3Al_5O_{12}$, magnesium oxide.

3. The process as claimed in claim 1, wherein the mixing is performed by milling in an attritor or a ball mill.

4. The process as claimed in claim 1, wherein the monomers employed are methacrylamide or polyethylene glycol 1000 dimethacrylate, 2-hydroxyethyl methacrylate, tetrahydrofuryl methacrylate, 2-carboxyethyl acrylate, N,N-dimethylacrylamide, 1-vinyl-2-pyrrolidone and polyethylene glycol 1000 monomethyl ether monomethacrylate, N,N-methylenebisacrylamide and PEO(5800)-b-PPO(3000)-b-PEO(5800) dimethacrylate and/or mixtures of these monomers.

5. The process as claimed in claim 1, wherein the photoinitiator employed is 1-hydroxycyclohexylphenylketone or 2-hydroxy-2-methylpropiophenone.

6. The process as claimed in claim 1, wherein the degassing is performed under vacuum.

7. The process as claimed in claim 1, wherein a carrier made of a porous material is employed.

8. The process as claimed in claim 1, wherein the mixture in the mold is irradiated with light over 5 min to 20 min.

9. The process as claimed in claim 1, wherein the mixture is introduced into the mold and subsequently irradiated and subsequently the mixture of a mixture having a different composition is introduced into the mold atop the previously irradiated mixture two or more times and after each introduction of a mixture said mixture is irradiated.

10. The process as claimed in claim 1, wherein in the case of repeated introduction of mixtures into the mold identical or different amounts of mixture are introduced, wherein the individual mixtures are introduced atop one another to effect complete or partial coverage.

11. The process as claimed in claim 1, wherein in the case of introduction of mixtures of different compositions the mixtures are irradiated with light of different or identical wavelength and/or for different or identical durations.

12. The process as claimed in claim 1, wherein during production of the molded body as a gel body, dried gel body, green body and sintered body in the sequence of the process procedure the process conditions are realized under atmospheric conditions and/or pressurelessly.

13. The process as claimed in claim 1, wherein known auxiliary and additive substances are employed for the suspending, mixing and producing of the molded bodies up to the gel body.

14. The process as claimed in claim 1, wherein the drying of the molded body is performed in a polymer solution and atop and/or between carriers.

15. The process as claimed in claim 14, wherein the polymer solution employed is selected from water soluble or alcohol-soluble polymers, such as polyvinyl alcohol, polyvinyl acetate, polyacrylamide, polyamide, polyethylene oxide, polyacrylate, polyvinylpyrrolidone, polyethylene glycol and/or derivatives or mixtures thereof.

16. The process as claimed in claim 1, wherein the sintering is performed under the sintering conditions known for the sintering of transparent ceramics and/or to produce warpage-free transparent ceramics the parts are subjected to mechanical load at least during the sintering.

17. The process as claimed in claim 1, wherein after the sintering of the molded body a mechanical machining of the sintered body by sawing, grinding and/or polishing is performed.

18. The process as claimed in claim 1, wherein molds which realize molded bodies having thicknesses of 50 to 1000 μm are employed.

19. The process as claimed in claim 1, wherein molds which realize molded bodies having thicknesses of 100 to 500 μm are employed.

20. The process as claimed in claim 1, wherein a carrier made of paper sheets, membranes or ceramic films is employed.

* * * * *